United States Patent
Schroedle et al.

(10) Patent No.: US 10,707,486 B2
(45) Date of Patent: Jul. 7, 2020

(54) PROCESS FOR MAKING A CATHODE ACTIVE MATERIAL AND A PRECURSOR THEREFORE, CATHODE ACTIVE MATERIAL AND ITS USE

(71) Applicant: BASF SE, Ludwigshafen (DE)

(72) Inventors: Simon Schroedle, Ludwigshafen (DE); Thomas Michael Ryll, Heddesheim (DE); Aleksei Volkov, Ludwigshafen (DE); Ji-Yong Shin, Mannheim (DE); Jordan K. Lampert, Cleveland, OH (US)

(73) Assignee: BASF SE, Ludwigshafen (DE)

( * ) Notice: Subject to any disclaimer, the term of this patent is extended or adjusted under 35 U.S.C. 154(b) by 181 days.

(21) Appl. No.: 15/751,308

(22) PCT Filed: Aug. 10, 2016

(86) PCT No.: PCT/EP2016/069032
§ 371 (c)(1),
(2) Date: Feb. 8, 2018

(87) PCT Pub. No.: WO2017/029166
PCT Pub. Date: Feb. 23, 2017

(65) Prior Publication Data
US 2018/0358615 A1  Dec. 13, 2018

(30) Foreign Application Priority Data
Aug. 17, 2015  (EP) .................... 15181201

(51) Int. Cl.
*H01M 4/52* (2010.01)
*H01M 4/525* (2010.01)
*C01G 53/00* (2006.01)
*H01M 4/505* (2010.01)
*H01M 4/131* (2010.01)
*C01G 53/04* (2006.01)
*H01M 10/0525* (2010.01)
*H01M 10/0567* (2010.01)
(Continued)

(52) U.S. Cl.
CPC .......... *H01M 4/525* (2013.01); *C01G 53/006* (2013.01); *C01G 53/04* (2013.01); *C01G 53/50* (2013.01); *H01M 4/131* (2013.01); *H01M 4/505* (2013.01); *H01M 10/0525* (2013.01); *C01P 2002/50* (2013.01); *C01P 2002/52* (2013.01); *C01P 2002/54* (2013.01); *C01P 2004/32* (2013.01); *C01P 2004/50* (2013.01); *C01P 2004/51* (2013.01); *C01P 2004/61* (2013.01); *C01P 2006/11* (2013.01); *C01P 2006/12* (2013.01); *C01P 2006/40* (2013.01); *H01M 10/052* (2013.01); *H01M 10/0567* (2013.01); *H01M 10/4235* (2013.01); *H01M 2004/028* (2013.01)

(58) Field of Classification Search
CPC .. H01M 4/131; H01M 4/505; H01M 10/4235; H01M 10/052; H01M 10/0525; H01M 4/525; C01G 45/02; C01G 51/04; C01G 51/50; C01G 53/006; C01G 53/04; C01G 53/50; C01P 2002/50; C01P 2002/52; C01P 2002/54; C01P 2004/32; C01P 2004/50; C01P 2004/51; C01P 2004/61; C01P 2006/11; C01P 2006/12; C01P 2006/40
USPC ......................................... 429/223
See application file for complete search history.

(56) References Cited

U.S. PATENT DOCUMENTS 9,406,930 B2 * 8/2016 Fukui ................. H01M 4/505
2011/0049420 A1  3/2011 Ellenwood et al.
(Continued)

FOREIGN PATENT DOCUMENTS

CN   103108833 A   5/2013
EP   2796415 A1   10/2014
(Continued)

OTHER PUBLICATIONS

European Search Report dated Feb. 24, 2016 in Patent Application No. 15181201.3, 2 pages.
(Continued)

*Primary Examiner* — Amanda C. Walke
(74) *Attorney, Agent, or Firm* — Oblon, McClelland, Maier & Neustadt, L.L.P.

(57) ABSTRACT

The present invention is directed towards a process for making a particulate material according to the general formula (I): $Ni_aCo_bMn_cM_d(O)_x(OH)_y$, wherein M is selected from Al and Ti, x is in the range of from 0.01 to 0.9, y is in the range of from 1.1 to 1.99, a is in the range of from 0.3 to 0.85, b is in the range of from 0.05 to 0.4, c is in the range of from 0.1 to 0.5, d is in the range of from 0.001 to 0.03, with a+b+c+d=1 said process comprising the following steps: (a) providing an aqueous slurry of particles of aluminum hydroxide or titanium dioxide, (b) adding an aqueous solution of water-soluble salts of nickel, cobalt and manganese and a solution of alkali metal hydroxide to the slurry according to step (a), thereby co-precipitating a layer of a mixed hydroxide of nickel and cobalt and manganese hydroxide on the particles according to step (a), (c) removing particles of $(Ni_aCo_bMn_cAl_d)(OH)_{2+d}$ or $(Ni_aCo_bMn_cTi_d)(OH)_{2+2d}$ so obtained and drying them in the presence of oxygen.

14 Claims, No Drawings

(51) Int. Cl.
*H01M 10/42* (2006.01)
*H01M 10/052* (2010.01)
*H01M 4/02* (2006.01)

(56) References Cited

U.S. PATENT DOCUMENTS

| | | | | |
|---|---|---|---|---|
| 2011/0091768 | A1* | 4/2011 | Ohashi | H01M 10/052 |
| | | | | 429/199 |
| 2014/0335406 | A1* | 11/2014 | An | H01M 10/0525 |
| | | | | 429/200 |
| 2014/0377660 | A1* | 12/2014 | Fukui | H01M 4/505 |
| | | | | 429/223 |
| 2016/0093881 | A1 | 3/2016 | Schroedle et al. | |
| 2016/0156033 | A1* | 6/2016 | Fujii | H01M 10/0525 |
| | | | | 429/223 |
| 2018/0013129 | A1* | 1/2018 | Lee | H01M 2/10 |

FOREIGN PATENT DOCUMENTS

| | | |
|---|---|---|
| WO | 2009/074311 A1 | 6/2009 |
| WO | 2020/037975 | 3/2012 |
| WO | 2014/180686 A1 | 11/2014 |
| WO | WO 2016/000982 A1 | 1/2016 |

OTHER PUBLICATIONS

U.S. Appl. No. 15/318,887, filed Dec. 14, 2016, Aleksei Volkov, et al.
International Search Report dated Nov. 3, 2016, in PCT/EP2016/069032, filed Aug. 10, 2010.
International Preliminary Report on patentability dated Oct. 31, 2017 in PCT/EP2016/069032, filed Aug. 10, 2016.

* cited by examiner

PROCESS FOR MAKING A CATHODE ACTIVE MATERIAL AND A PRECURSOR THEREFORE, CATHODE ACTIVE MATERIAL AND ITS USE

This application is a National Phase of PCT/EP2016/069032, which was filed on Aug. 10, 2016. This application is based upon and claims the benefit of priority to European Application No. 15181201.3, which was filed on Aug. 17, 2015.

The present invention is directed towards a process for making a particulate material according to the general formula (I)

$$Ni_aCo_bMn_cM_d(O)_x(OH)_y \qquad (I)$$

wherein
M is selected from Al and Ti,
x is in the range of from 0.01 to 0.9,
y is in the range of from 1.1 to 1.99,
a is in the range of from 0.3 to 0.85,
b is in the range of from 0.05 to 0.4,
c is in the range of from 0.1 to 0.5,
d is in the range of from 0.001 to 0.03,
with a+b+c+d=1
said process comprising the following steps:
(a) providing an aqueous slurry of particles of aluminum hydroxide or titanium dioxide,
(b) adding an aqueous solution of water-soluble salts of nickel, cobalt and manganese and a solution of alkali metal hydroxide to the slurry according to step (a), thereby co-precipitating a layer of a mixed hydroxide of nickel and cobalt and manganese hydroxide on the particles according to step (a),
(c) removing particles of $(Ni_aCo_bMn_cAl_d)(OH)_{2+d}$ or $(Ni_aCo_bMn_cTi_d)(OH)_{2+2d}$ so obtained and drying them in the presence of oxygen.

Additionally, the present invention is directed towards a particulate material obtainable according to the above process. Additionally, the present invention is directed towards a cathode active material that can be made from particulate material according to the above process, and to their use in lithium ion batteries.

Furthermore, the present invention is directed to particulate materials and their use in lithium ion batteries.

Lithiated transition metal oxides with layered structures are currently being used as electrode materials for lithium-ion batteries. Extensive research and developmental work has been performed in the past years to improve properties like charge density, energy, but also other properties like the reduced cycle life and capacity loss that may adversely affect the lifetime or applicability of a lithium-ion battery.

In a usual process for making cathode materials for lithium-ion batteries, first a so-called precursor is being formed by co-precipitating the transition metals as carbonates, oxides or preferably as hydroxides that may or may not be basic. The precursor is then mixed with a lithium salt such as, but not limited to LiOH, $Li_2O$, $LiNO_3$ or—especially— $Li_2CO_3$ followed by calcination.

Despite all efforts spent so far, electrochemical cells based on lithium ions as charge carriers and the respective lithium ion batteries still suffer from technical disadvantages when used, e.g., in automotive applications. In the perception of most of the users, the capacity is still insufficient, and the battery needs reloading too soon. In addition, reloading takes a lot of time. In particular cases, e.g. Li-ion batteries for hybrid vehicles or for plug-in vehicles, cathode materials allowing for a fast charge and discharge at high currents with littler internal losses are of interest. Therefore, even incremental improvements are of interest. However, such incremental changes must not lower the safety performance of the respective battery.

In EP 2 796 415 A, lithiated nickel-cobalt-oxides are disclosed that are doped with traces of manganese and coated with alumina.

In some instances, doping with a metal such as titanium or aluminum has helped to improve battery safety as well as cycle life and impedance build-up during reversible cycling. However, it has turned out that such an improvement is on the expense of the overall capacity.

It was an objective of the present invention to provide electrochemical cells with an improved rate performance. It was further an objective of the present invention to provide components for electrochemical cells that help to decrease the electrode resistance without negatively affecting the electrochemical performance of electrochemical cells. It was further an objective of the present invention to provide a method for making components for electrochemical cells that help to improve the rate performance without negatively affecting electrochemical performance of the resulting electrochemical cells.

Accordingly, the process as defined at the outset has been found, hereinafter also referred to as inventive process or process according to the present invention.

The inventive process is a process for making a particulate material of general formula (I)

$$Ni_aCo_bMn_cM_d(O)_x(OH)_y \qquad (I)$$

wherein
M is selected from Al and Ti, preferably M is Al,
x is in the range of from 0.01 to 0.9, preferably 0.4 to 0.7,
y is in the range of from 1.1 to 1.99, preferably 1.3 to 1.6,
a is in the range of from 0.3 to 0.85, preferably 0.32 to 0.7,
b is in the range of from 0.05 to 0.4, preferably from 0.2 to 0.35,
c is in the range of from 0.1 to 0.5, preferably from 0.1 to 0.35,
d is in the range of from 0.001 to 0.03,
with a+b+c+d=1
said process comprising the following steps:
(a) providing an aqueous slurry of particles of aluminum hydroxide or titanium dioxide,
(b) adding an aqueous solution of water-soluble salts of nickel, cobalt and manganese and a solution of alkali metal hydroxide to the slurry according to step (a), thereby co-precipitating a layer of a mixed hydroxide of nickel and cobalt and manganese hydroxide on the particles according to step (a),
(c) removing particles of $(Ni_aCo_bMn_cAl_d)(OH)_{2+d}$ or $(Ni_aCo_bMn_cTi_d)(OH)_{2+2d}$ so obtained and drying them in the presence of oxygen.

In the content of the present invention, the equation "a+b+c+d=1" shall allow a rounding error of ±0.01.

In a preferred embodiment,
a is in the range of from 0.32 to 0.7,
b is in the range of from 0.2 to 0.35,
c is in the range of from 0.1 to 0.35, and
d is in the range of from 0.002 to 0.03.

The term "particulate" in the context with material of general formula (I) shall mean that said material is provided in the form of particles with a maximum particle diameter not exceeding 32 µm. Said maximum particle diameter can be determined by, e.g. sieving.

In one embodiment of the present invention, the particulate material of general formula (I) is comprised of spherical particles, that are particles having a spherical shape. Spherical particles shall include not just those which are exactly spherical but also those particles in which the maximum and minimum diameter of at least 90% (number average) of a representative sample differ by not more than 10%.

In one embodiment of the present invention, the particulate material of general formula (I) is comprised of secondary particles that are agglomerates of primary particles. Preferably, the particulate material of general formula (I) is comprised of spherical secondary particles that are agglomerates of primary particles. Even more preferably, the particulate material of general formula (I) is comprised of spherical secondary particles that are agglomerates of spherical primary particles or platelets In one embodiment of the present invention, the mean particle diameter (D50) of particles of material of general formula (I) is in the range of from 3 to 8 µm, preferably 3.5 to 6 µm. The mean particle diameter (D50) in the context of the present invention refers to the median of the volume-based particle diameter, as can be determined, for example, by light scattering.

Said mixed hydroxide of nickel, cobalt and manganese may comprise counterions other than hydroxide, for example carbonate, sulfate, nitrate, carboxylate, especially acetate, or halide, especially chloride. A particularly preferred counterion, apart from hydroxide, is oxide, especially in combination with sulfate. It is possible for carbonate, sulfate, carboxylate or halide to be present in traces in mixed transition hydroxide of nickel, cobalt and manganese, for example of up to 1% by weight, based on hydroxide. Oxide may be present in greater proportions in mixed hydroxide of nickel, cobalt and manganese; for example, every tenth anion may be an oxide ion.

Said mixed hydroxide of nickel, cobalt and manganese may contain traces of other metal ions, for example traces of ubiquitous metals such as sodium, Ca or Zn, but such traces will not be taken into account in the description of the present invention. Traces in this context will mean amounts of 0.5 mol-% or less, referring to the total metal content of said mixed hydroxide of nickel, cobalt and, optionally, manganese.

The steps (a) to (c) will be explained in more details below.

Steps (a) to (c) of the inventive process are performed in the order step (a), step (b), step (c). They may be performed consecutively without substantial intermediate steps, or they may be performed with one or more intermediate steps.

In step (a), an aqueous slurry of particles of titanium dioxide or, preferably, aluminum hydroxide is provided.

In the context of the present invention, the terms aluminum hydroxide and titanium oxide are each used as idealized version of the respective hydroxide. Titanium dioxide in the context of the inventive process does not only include $TiO_2$ but also water-containing materials that may be summarized as $TiO_2.aq$. Aluminum hydroxide in the context of the inventive process does not only include $Al(OH)_3$ but also materials that may be summarized as $Al_2O_3.aq$.

In one embodiment of the present invention, the average particle diameter of particles of titanium dioxide or, preferably, aluminum hydroxide is in the range of from 0.4 µm to 4 µm, preferably 0.6 µm to 3 µm, determined, e.g., by light scattering.

In one embodiment of the present invention, the solids content of the slurry provided in step (a) is in the range of from 0.1 g/l to 1 g/l, preferably 0.5 g/l to 0.2 g/l.

The pH value of the slurry provided according to step (a) of the inventive process may be in the range of from 7 to 13, preferably 11.4 to 12.4.

Particles of aluminum hydroxide or titanium dioxide may be freshly precipitated or freshly slurried. In one embodiment of the present invention the above slurry is provided by charging a reaction vessel with said slurry. Even more preferably, step (a) is performed by freshly precipitating particles of aluminum hydroxide or titanium dioxide, for example by introducing a solution of an aluminate or of a titanium salt into a reaction vessel.

Aluminate may be selected from alkali metal aluminate, preferred is sodium aluminate, $NaAlO_2$. A preferred example of titanium salt is $TiOSO_4$.

In one embodiment of the present invention, aqueous solution of an aluminate or titanate has a concentration of from 1 to 300 g $Al^{3+}$/l or Ti(+IV)/l, respectively.

In one embodiment of the present invention, said aqueous solution of aluminate has a pH value about 14.

In one embodiment of the present invention, said aqueous solution of titanate has a pH value in the range of from 1 to 4.

The pH value of said aqueous solution of aluminate or titanium salt is then preferably adjusted to 7 to 13, and said adjustment causes precipitation of aluminum hydroxide or titanium dioxide, respectively.

Said adjustment of the pH value is preferably performed under mixing, for example stirring.

Said adjustment of the pH value may be performed by adding an aqueous solution of alkali metal hydroxide or ammonia or both to an aqueous solution of aluminate or titanium salt, or by adding an aqueous solution of aluminate or titanium salt to an aqueous solution of alkali metal hydroxide or ammonia or to an aqueous solution of alkali metal hydroxide and ammonia. Examples of suitable alkali metal hydroxides are especially potassium hydroxide and sodium hydroxide.

In a preferred embodiment, said adjustment of pH value is performed at a temperature in the range of from 15 to 80° C., more preferably 35 to 60° C. The pressure is not critical, it may range from 0.5 bar to 20 bar. For technical reasons, normal pressure is preferred.

Step (b) of the inventive process begins after completion of step (a). Step (b) includes adding an aqueous solution of water-soluble salts of nickel, cobalt and manganese and a solution of alkali metal hydroxide to the slurry according to step (a). By performing step (b), a mixed hydroxide of mixed hydroxide of nickel, cobalt and manganese is being co-precipitated. Without wishing to be bound by any theory, we assume that the particles obtained under step (a) serve as seed particles for the co-precipitation of said mixed hydroxide of nickel, cobalt and manganese.

By performing step (b) of the inventive process, a solution containing water-soluble salts of nickel, cobalt and manganese is contacted with a solution of alkali metal hydroxide. An example of alkali metal hydroxides is lithium hydroxide, preferred is potassium hydroxide and even more preferred is sodium hydroxide. Combinations of potassium hydroxide and sodium hydroxide, for example in molar ratios in the range of from 5:1 to 1:5, may be applied as well.

Said addition of aqueous solution of water-soluble salts of nickel, cobalt and manganese and solution of alkali metal hydroxide can be performed by simultaneously feeding a solution of alkali metal hydroxide and one or more solutions of water-soluble salts of nickel, cobalt and manganese into a vessel, preferably under stirring. It is preferred to perform such contacting by feeding a solution of alkali metal hydroxide and a solution containing water-soluble salts of each cobalt, nickel and manganese, in the molar ratio of said material of general formula (I).

Water-soluble in the context of the present invention shall mean that such salt has a solubility of at least 20 g/l in distilled water at 20° C., the amount of salt being determined under omission of crystal water and of water stemming from aquo complexes. Water-soluble salts of nickel, cobalt and manganese may preferably be the respective water-soluble salts of $Ni^{2+}$, $Co^{2+}$, and, optionally, $Mn^{2+}$.

In one embodiment of the present invention, the step (b) of the inventive process is performed at temperatures in the range from 10 to 85° C., preferably at temperatures in the range from 20 to 60° C.

In one embodiment of the present invention, step (b) of the inventive process is performed at a pH value in the range from 8 to 13, preferably 10.5 to 12.5, more preferably 11.3 to 11.9, each measured in the mother liquor at 23° C.

In one embodiment of the present invention, step (b) of the inventive process is performed at a pressure in the range from 500 mbar to 20 bar, preferably standard pressure.

In one embodiment of the present invention, an excess of precipitant is used, for example alkali metal hydroxide, based on transition metal. The molar excess may, for example, be in the range from 1.1:1 to 100:1. It is preferable to work with a stoichiometric proportion of precipitant. In one embodiment of the present invention, aqueous solution of alkali metal hydroxide has a concentration of alkali metal hydroxide in the range from 1 to 50% by weight, preferably 10 to 25% by weight.

In one embodiment of the present invention, the concentrations of aqueous solution of nickel, cobalt, and manganese salts can be selected within wide ranges. Preferably, the concentrations are selected such that they are within the range of, in total, 1 to 1.8 mol of the transition metals/kg of solution, more preferably 1.5 to 1.7 mol of the transition metals/kg of solution. "The transition metal salts" used herein refers to the water-soluble salts of nickel, cobalt and manganese.

In one embodiment of the present invention, step (b) of the inventive process is performed in the presence of at least one compound L which may serve as a ligand for at least one of the transition metals, for example in the presence of at least one organic amine or especially of ammonia. In the context of the present invention, water should not be regarded as a ligand.

In one embodiment of the present invention, a concentration of L, especially of ammonia, within the range from 0.05 to 1 mol/l, preferably 0.1 to 0.7 mol/l, is selected. Particular preference is given to amounts of ammonia for which the solubility of $Ni^{2+}$ in the mother liquor is not more than 1000 ppm, more preferably not more than 500 ppm.

In one embodiment of the present invention, mixing is effected during step (b) of the inventive process, for example with a stirrer. Preference is given to introducing a stirrer output of at least 1 W/l into the reaction mixture, preferably at least 3 W/l and more preferably at least 5 W/l. In one embodiment of the present invention, a stirrer output of not more than 25 W/l can be introduced into the reaction mixture.

Step (b) of the inventive process may be performed in the presence or absence of one or more reducing agents. Examples of suitable reducing agents are hydrazine, ascorbic acid, glucose and alkali metal sulfites. It is preferable not to use any reducing agent in step (a).

Step (b) of the inventive process may be performed under air, under inert gas atmosphere, for example under noble gas or nitrogen atmosphere, or under reducing atmosphere. An example of a reducing gas is, for example, $SO_2$. Preference is given to working under inert gas atmosphere.

In one embodiment of the present invention, step (b) has a duration in the range of 1 to 40 hours, preferably of 2 to 30 hours.

Step (b) of the inventive process furnishes a mixed hydroxide of nickel, cobalt, and manganese in the form of particles that are slurried in their mother liquor and that contain some aluminum hydroxide or titanium dioxide. Said particles may have an irregular or preferable a spherical shape. Their formula may be summarized as $(Ni_aCo_bMn_cAl_d)(OH)_{2+d}$ or $(Ni_aCo_bMn_cTi_d)(OH)_{2+2d}$, respectively.

In one embodiment of the present invention, each aqueous solution of water-soluble salts of nickel, cobalt and manganese on one hand and of solution of alkali metal hydroxide on the other hand are added at a constant rate, and aqueous solution of water-soluble salts of nickel, cobalt and manganese has a constant composition. In this embodiment, the distribution of the transition metals nickel, cobalt and manganese in particles formed in step (b) of the inventive process is homogeneous.

In alternative embodiments, the rates of addition of aqueous solution of water-soluble salts of nickel, cobalt and manganese on one hand and of solution of alkali metal hydroxide on the other hand are changed during step (a) of the inventive process, and/or the composition of the aqueous solution of water-soluble salts of nickel, cobalt and manganese is altered during step (a). In the latter embodiment, particles of mixed hydroxides may be obtained in which at least two of the transition metals exhibit a concentration gradient.

Preferably, the pH value is being maintained essentially the same during steps (a) and (b), essentially the same meaning in this context that the pH varies by 0.5 units or less.

In a preferred embodiment, step (a) and step (b) may be performed under the same conditions of pressure, temperature, and stirring.

Step (c) of the inventive process comprises removing particles of $(Ni_aCo_bMn_cAl_d)(OH)_{2+d}$ or $(Ni_aCo_bMn_cTi_d)(OH)_{2+2d}$, respectively, so obtained and drying them in the presence of oxygen.

Removal of particles of $(Ni_aCo_bMn_cAl_d)(OH)_{2+d}$ or $(Ni_aCo_bMn_cTi_d)(OH)_{2+2d}$, respectively, refers to removal of said particles from the respective mother liquor. The removal can be effected, for example, by filtration, centrifugation, decantation, spray drying or sedimentation, or by a combination of two or more of the aforementioned operations. Suitable apparatuses are, for example, filter presses, belt filters, spray dryers, hydrocyclones, inclined clarifiers or combinations of the aforementioned apparatuses.

Mother liquor refers to water, water-soluble salts and any further additives present in solution. Possible water-soluble salts are, for example, alkali metal salts of the counterions of the transition metals, for example sodium acetate, potassium acetate, sodium sulfate, potassium sulfate, sodium nitrate, potassium nitrate, sodium halide, especially sodium chloride, potassium halide, and also additional salts, any additives used, and any excess alkali metal hydroxide, and also ligand L. In addition, the mother liquor may comprise traces of soluble transition metal salts.

It is desirable to remove the particles as completely as possible.

As with aluminum hydroxide and titanium dioxide, the formulae $(Ni_aCo_bMn_cAl_d)(OH)_{2+d}$ and $(Ni_aCo_bMn_cTi_d)(OH)_{2+2d}$, respectively, are to be viewed as idealized formulae.

After the actual removal, the particles of $(Ni_aCo_bMn_cAl_d)(OH)_{2+d}$ or $(Ni_aCo_bMn_cTi_d)(OH)_{2+2d}$, respectively, can be washed. Washing can be effected, for example, with pure water or with an aqueous solution of alkali metal carbonate or alkali metal hydroxide, especially with an aqueous solution of sodium carbonate, potassium carbonate, sodium hydroxide, potassium hydroxide or ammonia. Water and aqueous solution of alkali metal hydroxide, especially of sodium hydroxide, are preferred.

The washing can be effected, for example, with employment of elevated pressure or elevated temperature, for example 30 to 50° C. In another variant, the washing is performed at room temperature. The efficiency of the washing can be checked by analytical measures. For example, the content of transition metal(s) in the washing water can be analyzed by conductivity measurements.

If washing is effected with water rather than with an aqueous solution of alkali metal hydroxide, it is possible to check with the aid of conductivity studies on the washing water whether water-soluble substances, for example water-soluble salts, can still be washed out.

After removal, the particles of $(Ni_aCo_bMn_cAl_d)(OH)_{2+d}$ or $(Ni_aCo_bMn_cTi_d)(OH)_{2+2d}$, respectively, are dried in the presence of oxygen. Presence of oxygen in this context refers to the presence of oxygen gas. Presence of oxygen therefore includes an atmosphere of air, of pure oxygen, of mixtures from oxygen with air, and of air diluted with an inert gas such as nitrogen.

The drying may be performed, for example, at a temperature in the range from 30 to 150° C. If the drying is performed with air, it is observed in many cases that some transition metals are partially oxidized, for example $Mn^{2+}$ to $Mn^{4+}$ and $Co^{2+}$ to $Co^{3+}$, and blackening of the particles $(Ni_aCo_bMn_cAl_d)(OH)_{2+d}$ or $(Ni_aCo_bMn_cTi_d)(OH)_{2+2d}$, respectively, is observed.

By performing the inventive process, a particulate material of general formula (I)

$$Ni_aCo_bMn_cM_d(O)_x(OH)_y \qquad (I)$$

is obtained, the variable being as defined above. In the context of the present invention, said particulate material is also referred to as inventive precursor.

The composition of inventive precursors may be determined, for example, by gravimetric analysis.

The inventive process may be performed continuously or batch-wise, batch-wise being preferred. A continuous process in a cascade of two or more stirred tank reactors is possible as well.

The surface according to BET may be determined, for example, by nitrogen adsorption/desorption methods according to DIN ISO 9277:2003-05.

Optional steps are washing the precursor with water or aqueous base or with both aqueous base and water, a preferred aqueous base being aqueous sodium hydroxide solution or aqueous potassium hydroxide solution, drying after washing, and sieving, for example with a 32 μm mesh sieve.

Inventive precursors are particularly useful for making cathode active materials for lithium ion batteries.

In order to convert an inventive precursor into a cathode active material, the following steps (d) to (f) may be performed:
(d) providing an inventive precursor,
(e) mixing said inventive precursor with at least one Li compound selected from $Li_2O$, LiOH and $Li_2CO_3$,
(f) calcining the mixture obtained according to step (e) at a temperature in the range of from 800 to 950° C.

In the context of the present invention, such a process is also being referred to as inventive calcination process.

To perform step (e) of the inventive calcination process, the procedure may be, for example, to mix inventive precursor with at least one lithium compound selected from $Li_2O$, LiOH and $Li_2CO_3$, water of crystallization being neglected in the context of the present invention. Preferred source of lithium is $Li_2CO_3$.

To perform step (e) of the inventive calcination process, the amounts of inventive precursor and lithium compound are selected so as to obtain the stoichiometry of the desired material of formula (II). Preferably, inventive precursor and lithium compound(s) are selected such that the molar ratio of lithium to the sum of all transition metals and any M is in the range from 1.02:1 to 1.25:1, preferably 1.03:1 to 1.2:1, even more preferably 1.03:1 to 1.15:1.

To perform step (f) of the inventive process, the mixture obtained according to step (e) is calcined at a temperature in the range of from 750 to 950° C., preferably 800 to 920° C.

Step (f) of the inventive process may be performed in a furnace, for example in a rotary tube furnace, in a muffle furnace, in a pendulum furnace, in a roller hearth furnace or in a push-through furnace. Combinations of two or more of the aforementioned furnaces are possible as well.

Step (f) of the inventive process can be performed over a period of 30 minutes to 24 hours, preferably 3 to 12 hours. Step (f) can be effected at a temperature level, or a temperature profile can be run.

In one embodiment of the present invention, step (f) is being performed in an oxygen-containing atmosphere. Oxygen-containing atmosphere includes an atmosphere of air, of pure oxygen, of mixtures from oxygen with air, and of air diluted with an inert gas such as nitrogen. In step (e), preferred is an atmosphere of oxygen or oxygen diluted with air or nitrogen and a minimum content of oxygen of 21 vol.-%.

In one embodiment of the present invention, between steps (d) and (e) at least one pre-calcining step (f*) is being performed. Step (f*) comprises heating the mixture obtained in step (d) at a temperature in the range of from 300 to 700° C. for a period of 2 to 24 hours, and performing step (e) with the material obtained in step(s) (f*).

In one embodiment of the present invention, two pre-calcining steps are being performed between steps (e) and (f). Said two pre-calcining steps include heating the mixture obtained in step (d) at a temperature in the range of from 300 to 400° C. for a period of 2 to 12 hours, followed by heating the material so obtained at a temperature in the range of from 500 to 700° C. for a period of 2 to 12 hours.

During the temperature changes, a heating rate of 1 K/min up to 10 K/min can be obtained, preferred is 2 to 5 K/min.

During step (f), the hydroxide precursor is converted into particulate material of general formula (II). Without wishing to be bound by any theory, during step (e) the $Al^{3+}$-cations or the $Ti^{4+}$ cations, respectively, may diffuse freely within the particles. Transition metal ions such as Ni cations and Co cations and Mn cations diffuse much slower if at all.

After having performed step (f) of the inventive process, a particulate material according to formula (II) is obtained.

Additional steps may be performed, such as cooling down the particulate material, or sieving in order to remove agglomerates with a particles diameter of more than 32 µm.

The particulate material obtained according to the inventive process is well suited as cathode active material. It combines a low area specific resistance and high capacity.

Another aspect of the present invention is a cathode active material, hereinafter also being referred to as "inventive cathode material", for a lithium ion battery, essentially consisting of particles of general formula (II)

$$Li_{1+w}(Ni_aCo_bMn_cM_d)_{1-w}O_2 \quad (II)$$

wherein

M is selected from Al and Ti and, preferably, M is Al, a is in the range of from 0.3 to 0.85, preferably 0.32 to 0.7, b is in the range of from 0.05 to 0.4, preferably from 0.2 to 0.35, c is in the range of from 0.1 to 0.5, preferably from 0.1 to 0.35, d is in the range of from 0.001 to 0.03, w is in the range of from 0.01 to 0.15, preferably 0.014 to 0.15, with a+b+c+d=1, said cathode active material having a surface according to BET multi-point measurement in the range of from 1.5 m²/g to 5 m²/g.

wherein M is homogeneously dispersed within said particles, and wherein said particles have an average particle diameter (D50) in the range of from 3 to 8 µm.

In a preferred embodiment of the present invention, said particles have an average particle diameter (D50) in the range of from 3 to 8 µm, preferably 3.5 to 6 µm. In the context of the present invention, average particle diameter and mean particle diameter are used interchangeably.

The average particle diameter (D50) in the context of the present invention refers to the median of the volume-based particle diameter, as can be determined, for example, by light scattering.

Particles constituting the inventive cathode material have a particle diameter distribution D90/D50 in the range of from 1.3 to 2.0.

M is homogeneously dispersed within said particles that constitute the respective inventive material. One way to determine whether M is homogeneously dispersed in particles of particulate material according to formula (II) is by SEM/EDX mapping.

In one embodiment of the present invention, b is in the range of from 0.25 to 0.35 and c is in the range of from 0.25 to 0.35, with a+b+c+d=1.

The inventive cathode active material essentially consists of particles general formula (II). In the context of the present invention, that means that the inventive cathode active material contains neither separate $Al_2O_3$ particles nor separate $TiO_2$ particles, determined by SEM or EDX or a combination of EDX and SEM. In the context of the present invention, "essentially consisting of particles of general formula (II)" shall include cathode active materials that contain less than 1 separate particle of $Al_2O_3$ or $TiO_2$, respectively, per 100 particles of compound of general formula (II). Even more preferably, cathode materials according to the present invention do not contain detectable amounts of $Al_2O_3$ and $TiO_2$ particles.

In one embodiment of the present invention inventive cathode active material contains in the range of from 0.01 to 2% by weight $Li_2CO_3$, determined as $Li_2CO_3$ and referring to said cathode active material.

In one embodiment of the present invention, the surface (BET) of inventive cathode active material is in the range of from 1.5 to 5 m²/g, preferably from 1.75 to 4 m²/g. The surface (BET) can be determined by nitrogen absorption, for example according to DIN 9277:2003-05. Multi-point measurement is in the range of from 1.5 m²/g to 5 m²/g.

In one embodiment of the present invention, inventive cathode active material has a specific conductivity in the range of from $10^{-5}$ to $10^{-3}$ S/cm. The specific conductivity is measured on a powder pellet at 500 bar.

In one embodiment of the present invention, inventive cathode active material has a tap density in the range of from 0.9 to 1.8 kg/l, preferably 1.1 to 1.5 kg/l, determined after 1,250 taps.

Inventive cathode active material may in particular serve as electrode material, especially for cathodes for lithium ion batteries.

A further aspect of the present invention are electrodes comprising at least one inventive cathode active material. They are particularly useful for lithium ion batteries. Lithium ion batteries comprising at least one electrode according to the present invention exhibit a very good discharge and cycling behavior, and in particular a favorable specific area resistance, when, for example, cycled to 4.2 V or more.

In one embodiment of the present invention, inventive cathodes contain (A) at least one cathode active material, as described above, (B) carbon in an electrically conductive state, and (C) a binder, (D) a current collector.

In a preferred embodiment of the present invention, inventive cathodes contain (A) 80 to 95% by weight cathode active material, (B) 3 to 17% by weight of carbon, (C) 3 to 10% by weight of binder material, percentages referring to the sum of (A), (B) and (C).

Cathodes according to the present invention contain carbon in electrically conductive modification, in brief also referred to as carbon (B). Carbon (B) can be selected from soot, active carbon, carbon nanotubes, graphene, and graphite. Carbon (B) can be added as such during preparation of electrode materials according to the invention.

Electrodes according to the present invention can comprise further components. They can comprise a current collector (D), such as, but not limited to, an aluminum foil. They further comprise a binder material (C), hereinafter also referred to as binder (C). Current collector (D) is not further described here.

Suitable binders (C) are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binder (C) may be cross-linked or non-cross-linked (co)polymers.

In a particularly preferred embodiment of the present invention, binder (C) is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive electrodes may comprise 3 to 10% by weight of binder(s) (d), referring to the sum of component (a), component (b) and carbon (c).

A further aspect of the present invention is a battery, containing
(1) at least one cathode comprising inventive cathode active material (A), carbon (B), and binder (C),
(2) at least one anode, and
(3) at least one electrolyte.

Embodiments of cathode (1) have been described above in detail.

Anode (2) may contain at least one anode active material, such as carbon (graphite), $TiO_2$, lithium titanium oxide, silicon or tin. Anode (2) may additionally contain a current collector, for example a metal foil such as a copper foil.

Electrolyte (3) may comprise at least one non-aqueous solvent, at least one electrolyte salt and, optionally, additives.

Nonaqueous solvents for electrolyte (3) can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (III) and (IV)

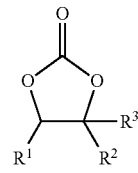

(III)

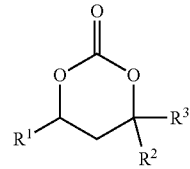

(IV)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (V).

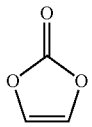

(V)

The solvent or solvents is/are preferably used in the water-free state, i.e. with a water content in the range from 1 ppm to 0.1% by weight, which can be determined, for example, by Karl-Fischer titration.

Electrolyte (3) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(CnF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where n is defined as above and t is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In a preferred embodiment of the present invention, electrolyte (3) contains at least one flame retardant. Useful flame retardants may be selected from trialkyl phosphates, said alkyl being different or identical, triaryl phosphates, alkyl dialkyl phosphonates, and halogenated trialkyl phosphates. Preferred are tri-$C_1$-$C_4$-alkyl phosphates, said $C_1$-$C_4$-alkyls being different or identical, tribenzyl phosphate, triphenyl phosphate, $C_1$-$C_4$-alkyl di-$C_1$-$C_4$-alkyl phosphonates, and fluorinated tri-$C_1$-$C_4$-alkyl phosphates.

In a preferred embodiment, electrolyte (3) comprises at least one flame retardant selected from trimethyl phosphate, $CH_3$—P(O)(OCH$_3$)$_2$, triphenylphosphate, and tris-(2,2,2-trifluoroethyl)phosphate.

Electrolyte (3) may contain 1 to 10% by weight of flame retardant, based on the total amount of electrolyte.

In an embodiment of the present invention, batteries according to the invention comprise one or more separators (4) by means of which the electrodes are mechanically separated. Suitable separators (4) are polymer films, in particular porous polymer films, which are unreactive toward metallic lithium. Particularly suitable materials for separators (4) are polyolefins, in particular film-forming porous polyethylene and film-forming porous polypropylene.

Separators (4) composed of polyolefin, in particular polyethylene or polypropylene, can have a porosity in the range from 35 to 45%. Suitable pore diameters are, for example, in the range from 30 to 500 nm.

In another embodiment of the present invention, separators (4) can be selected from among PET nonwovens filled with inorganic particles. Such separators can have a porosity in the range from 40 to 55%. Suitable pore diameters are, for example, in the range from 80 to 750 nm.

Batteries according to the invention can further comprise a housing which can have any shape, for example cuboidal or the shape of a cylindrical disk. In one variant, a metal foil configured as a pouch is used as housing.

Batteries according to the invention provide a very good discharge and cycling behavior, in particular at high temperatures (45° C. or higher, for example up to 60° C.) in particular with respect to the capacity loss.

Batteries according to the invention can comprise two or more electrochemical cells that combined with one another, for example can be connected in series or connected in parallel. Connection in series is preferred. In batteries according to the present invention, at least one of the electrochemical cells contains at least one electrode according to the invention. Preferably, in electrochemical cells according to the present invention, the majority of the electrochemical cells contain an electrode according to the present invention. Even more preferably, in batteries according to the present invention all the electrochemical cells contain electrodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those where may be moved manually, for example computers, especially laptops, telephones or electric hand tools, for example in the building sector, especially drills, battery-powered screwdrivers or battery-powered staplers.

The present invention is further illustrated by working examples.

WORKING EXAMPLES

General Remarks:

The tap density was determined essentially accordingly to DIN 53194 or DIN ISO 787-11.1981, with 1,250 taps but with smaller cylinders.

I. Synthesis of Precursors

The term "solution" refers to aqueous solutions unless specified otherwise. In the context of the present invention, the pH value refers to ambient temperature and it is determined at ambient temperature.

I.1 Synthesis of a Precursor TM-OH.1

A 9-l-stirred reactor with overflow for removing mother liquor was filled with distilled water and 36.7 g of ammonium sulfate per kg of water. The solution was heated to 40° C. and the pH value was adjusted to 11.6 by adding an aqueous 25 wt. % of sodium hydroxide solution.

Step (a.1):

An amount of 10 g of an aqueous solution of sodium aluminate with 100 g Al per kg of solution was added within 3 minutes. Particles of aluminum hydroxide precipitated. Their average diameter was in the range of from 1 to 2 µm.

Step (b.1)

The precipitation reaction according to step (b) was started by the simultaneous feed of an aqueous transition metal solution and an alkaline precipitation agent at a flow rate ratio of 1.9, and a total flow rate resulting in a residence time of 4.8 hours, to the slurry obtained in (a.1). The transition metal solution contained Ni, Co and Mn at a molar ratio of 1:1:1 and a total transition metal concentration of 1.65 mol/kg. The alkaline precipitation agent consisted of 25 wt. % sodium hydroxide solution and 25 wt. % ammonia solution in a weight ratio of 8.3. The pH was kept at 11.6 by the separate feed of 25 wt. % sodium hydroxide solution.

Beginning with the start-up of all feeds, mother liquor was removed so that the liquid level in the reactor stayed constant. After 4.8 hours of precipitation, all additions of solutions were stopped, and step (b.1) was finished.

Step (c.1)

Precursor TM-OH.1 was obtained by filtration of the resulting suspension, washed with distilled water, drying at 120° C. in air over a period of 12 hours and sieving with 32 μm (mesh).

I.2 Synthesis of Comparative Precursor C-TM-OH.2

The protocol under I.1 was repeated but step (a.1) was left out. Comparative precursor C-TM-OH.2 was obtained.

I.3 Synthesis of a Precursor TM-OH.3

A 9-l-stirred reactor with overflow for removing mother liquor was filled with distilled water and 36.7 g of ammonium sulfate per kg of water. The solution was heated to 40° C. and the pH value was adjusted to 11.6 by adding an aqueous 25 wt. % of sodium hydroxide solution.

Step (a.3):

An amount of 32 g of an aqueous solution of sodium aluminate (100 g Al per kg of solution) was added within 10 minutes. Particles of aluminum hydroxide precipitated. Their average diameter was in the range of from 1 to 2 μm.

Step (b.3)

The precipitation reaction according to step (b) was started by the simultaneous feed of an aqueous transition metal solution and an alkaline precipitation agent at a flow rate ratio of 1.9 kg/h, and a total flow rate resulting in a residence time of 4.8 hours, to the slurry obtained in (a.3). The transition metal solution contained Ni, Co and Mn at a molar ratio of 1:1:1 and a total transition metal concentration of 1.65 mol/kg. The alkaline precipitation agent consisted of 25 wt. % sodium hydroxide solution and 25 wt. % ammonia solution in a weight ratio of 8.3. The pH was kept at 11.6 by the separate feed of 25 wt. % sodium hydroxide solution. Beginning with the start-up of all feeds, mother liquor was removed so that the liquid level in the reactor stayed constant. After 4.8 hours of precipitation, all additions of solutions were stopped, and step (b.3) was finished.

Step (c.3)

Precursor TM-OH.1 was obtained by filtration of the resulting suspension, washing with distilled water, drying at 120° C. in air over a period of 12 hours and sieving with 32 μm (mesh).

II. Synthesis of Cathode Active Materials

II.1 Synthesis of a Cathode Active Material According to the Invention

Precursor TM.OH.1 was mixed with $Li_2CO_3$ so that the ratio of Li to metals other than lithium is 1.14 to 1. The mixture so obtained was then calcined in a muffle type furnace under the following conditions:

Heating Rate: 3 K/min

300° C. 6 hours, 600° C. 6 hours, 900° C. 6 hours.

After the calcination program the material so obtained was cooled to ambient temperature, deagglomerated in an agate mortar and sieved through a sieve with 32 μm mesh size.

Inventive cathode active material CAM.1 was obtained. It showed the following characteristics:

Al was homogeneously dispersed within the particles of CAM.1, the formula corresponded to $Li_{1.14}(Ni_{0.335}Co_{0.330}Mn_{0.332}Al_{0.003})O_{2.14}$, average particle diameter (D50) of 5.4 μm, the tap density was 1.2 kg/l, and the surface area (BET) was 2.0 m²/g.

II.2 Synthesis of a Comparative Cathode Active Material

Precursor C-TM.OH.2 was mixed with $Li_2CO_3$ so that the ratio of Li to metals other than lithium is 1.14 to 1. The mixture so obtained was then calcined in a muffle type furnace under the following conditions:

Heating Rate: 3 K/min

300° C. 6 hours, 600° C. 6 hours, 900° C. 6 hours.

After the calcination program the material so obtained was cooled to ambient temperature, deagglomerated in an agate mortar and sieved through a sieve with 32 μm mesh size.

Inventive cathode active material C-CAM.2 was obtained. It showed the following characteristics:

the formula corresponded to $Li_{1.15}(Ni_{0.319}Co_{0.345}Mn_{0.336})O_{2.15}$, the average particle diameter (D50) of 6.4 μm, the tap density was 2.0 kg/l, the surface area (BET) was 1.0 m²/g.

II.3 Synthesis of Cathode Active Material CAM.3 According to the Invention

Precursor TM.OH.3 was mixed with $Li_2CO_3$ so that the ratio of Li to metals other than lithium was 1.14 to 1. The mixture so obtained was then calcined in a muffle type furnace under the following conditions:

Heating Rate: 3 K/Min

300° C. 6 hours, 600° C. 6 hours, 900° C. 6 hours.

After the calcination program the material so obtained was cooled to ambient temperature, deagglomerated in an agate mortar and sieved through a sieve with 32 μm mesh size.

Inventive cathode active material CAM.3 was obtained. It showed the following characteristics:

Al was homogeneously dispersed within the particles of CAM.3, the formula corresponded to $Li_{1.15}(Ni_{0.323}Co_{0.331}Mn_{0.337}Al_{0.01})O_{2.14}$ average particle diameter (D50) of 4.6 μm, the tap density was 1.0 kg/l.

III. Electrochemical Performance

To produce a cathode (A.1), the following ingredients were blended with one another:

6 g polyvinylidene difluoride (C.1), ("PVdF"), commercially available as Kynar Flex® 2801 from Arkema Group, 3 g carbon black (B.1), BET surface area of 62 m²/g, commercially available as "Super C 65L" from Timcal, 3 g graphite (B.2), commercially available as KS6 from Timcal, and 88 g of either CAM.1, C-CAM.2 or CAM.3

While stirring, a sufficient amount of N-methylpyrrolidone (NMP) was added and the mixture was stirred with an Ultraturrax until a stiff, lump-free paste had been obtained.

Cathodes were prepared as follows: On a 30 μm thick aluminum foil (D.1), the above paste was applied with a 15 μm doctor blade. The loading after drying was 2 mA·h/cm². The loaded foil was dried overnight in a vacuum oven at 105° C. After cooling to room temperature in a hood disc-shaped cathodes were punched out of the foil. The cathode discs were then weighed and introduced into an argon glove box, where they are again vacuum-dried. Then, cells with the cathode discs were built.

Inventive cathodes (cat.1) and (cat.3) and comparative cathodes c-(cat.2) were obtained containing CAM.1, CAM.3 or C-CAM.2, respectively.

Separator: glass fiber. Anode: lithium. Inventive cells (cell.1) and (cell.3) and comparative cells c-(cell.12), respectively, were obtained. Potential range of the cells: 3 V-4.3 V.

Electrochemical testing was conducted in "TC1" coin type cells. The electrolyte used was a 1 M solution of LiPF$_6$ in ethyl methyl carbonate/ethylene carbonate (volume ratio 1:1).

In order to determine the overall ability to reversibly store and release Li ions the specific discharge capacity was measured at discharge rates of 0.1 C, 0.2 C, 0.5 C, 1 C, 2 C, 3 C, 5 C and 10 C. The electrode resistance was determined by pulse tests. For this purpose, the electrodes were adjusted to seven distinct charging levels between 10 and 90% state of charge (SOC). At each charge level the electrode was subjected to a 10 C discharge pulse for 10 seconds. The resulting voltage drop was used to calculate the area specific resistance for every electrode at different SOC. In terms of specific capacity at a discharge rate of 0.1 C and 10 C the two materials CAM.1 and C-CAM.2 showed the following characteristics.

(cell.1): 0.1 C 155 mA·h/kg, 10 C 74 mA·h/kg
c-(cell.2): 0.1 C 154 mA·h/kg, 10 C 91 mA·h/kg In terms of area specific electrode resistance at 90% and 10% SOC the following values were found:

(cell.1): 90% 21 Ωcm$^2$, 10% 122 Ωcm$^2$
c-(cell.2): 90% 39 Ωcm$^2$, 10% 198 Ωcm$^2$ It becomes apparent that the inventive cathode active material CAM.1 results in a cathode—and a cell (cell.1)—with a higher rate capability and lower electrode resistance compared to the comparative material C-CAM.2 and the resultant c-(cell.2). The observed improvement in rate characteristics does not have a negative impact on the overall capacity level at low discharge rates.

The invention claimed is:

1. A process for making a particulate material of formula (I):

$$Ni_aCo_bMn_cM_d(O)_x(OH)_y \quad (I)$$

wherein
M is Al or Ti,
x is in the range of from 0.01 to 0.9,
y is in the range of from 1.1 to 1.99,
a is in the range of from 0.3 to 0.85,
b is in the range of from 0.05 to 0.4,
c is in the range of from 0.1 to 0.5,
d is in the range of from 0.001 to 0.03,
with a+b+c+d=1,
the process comprising:
  (a) providing an aqueous slurry of particles of aluminium hydroxide or titanium dioxide,
  (b) adding an aqueous solution of water-soluble salts of nickel, cobalt and manganese and a solution of alkali metal hydroxide to the slurry of (a), thereby co-precipitating a layer of a mixed hydroxide of nickel and cobalt and manganese hydroxide on the particles of (a), and
  (c) removing particles of $(Ni_aCo_bMn_cAl_d)(OH)_{2+d}$ or $(Ni_aCo_bMn_cTi_d)(OH)_{2+2d}$ so obtained and drying the particles in the presence of oxygen.

2. The process according to claim 1, wherein, in the formula (I):
a is in the range of from 0.32 to 0.7,
b is in the range of from 0.25 to 0.35,
c is in the range of from 0.25 to 0.35, and
d is in the range of from 0.002 to 0.03.

3. The process according to claim 1, wherein (a) is performed by precipitating aluminium hydroxide from a solution of alkali metal aluminate at a pH value in the range from 10 to 13.

4. A particulate material of formula (I):

$$Ni_aCo_bMn_cM_d(O)_x(OH)_y \quad (I)$$

wherein:
M is Al or Ti,
x is in the range of from 0.01 to 0.9,
y is in the range of from 1.1 to 1.99,
a is in the range of from 0.3 to 0.85,
b is in the range of from 0.05 to 0.4,
c is in the range of from 0.1 to 0.5,
d is in the range of from 0.001 to 0.03,
with a+b+c+d=1; and
the particulate material has a surface according to BET multi-point measurement in the range of from 1.5 m$^2$/g to 5.0 m$^2$/g.

5. A process for manufacturing a cathode active material for a lithium ion battery, the process comprising:
  (d) providing a particulate material according to claim 4,
  (e) mixing said particulate material with at least one Li compound of Li$_2$O, LiOH and Li$_2$CO$_3$ to obtain a mixture, and
  (f) calcining the mixture at a temperature of from 800 to 950° C.

6. The process according to claim 5, wherein (f) last for 3 to 12 hours.

7. The process according to claim 5, wherein (f) is performed in an oxygen-containing atmosphere.

8. The process according to claim 5, wherein a molar ratio of lithium to a sum of Ni, Co, Mn and M is in the range of from 1.02 to 1 to 1.25 to 1.

9. A cathode active material, consisting essentially of particles of formula (II):

$$Li_{1+w}(Ni_aCo_bMn_cM_d)_{1-w}O_2 \quad (II)$$

wherein:
M is Al or Ti,
w is in the range of from 0.01 to 0.15,
a is in the range of from 0.32 to 0.7,
b is in the range of from 0.2 to 0.35,
c is in the range of from 0.1 to 0.35,
d is in the range of from 0.001 to 0.03,
with a+b+c+d=1;
the cathode active material has a surface according to BET multi-point measurement in the range of from 1.5 m$^2$/g to 5 m$^2$/g;
M is homogeneously dispersed within the particles; and
the particles have an average particle diameter D50 in the range of from 3 to 8 μm.

10. The cathode active material according to claim 9, which has a specific conductivity in the range of from 10$^{-5}$ to 10$^{-3}$ S/cm.

11. A cathode, comprising:
  (A) at least one cathode active material according to claim 9,
  (B) carbon in electrically conductive form,
  (C) a binder material, and
  (D) a current collector.

12. The cathode according to claim 11, comprising, relative to a sum of (A), (B), and (C):
  80 to 95% by weight of the cathode active material (A),
  3 to 17% by weight of carbon (B), and
  3 to 10% by weight of the binder material (C).

13. An electrochemical cell, comprising:
  at least one cathode according to claim 11.

14. The electrochemical cell according to claim 13, further comprising:
  an electrolyte comprising at least one flame retardant selected from the group consisting of trimethyl phosphate, $CH_3—P(O)(OCH_3)_2$, triphenylphosphate, and tris-(2,2,2-trifluoroethyl)phosphate.

\* \* \* \* \*

UNITED STATES PATENT AND TRADEMARK OFFICE
CERTIFICATE OF CORRECTION

PATENT NO. : 10,707,486 B2  
APPLICATION NO. : 15/751308  
DATED : July 7, 2020  
INVENTOR(S) : Simon Schroedle et al.

Page 1 of 1

It is certified that error appears in the above-identified patent and that said Letters Patent is hereby corrected as shown below:

On the Title Page

Column 2, item (57), Abstract, Line 3, "$CO_b$" should read -- $Co_b$ --; and
Line 16, delete "$CO_b$" and insert -- $Co_b$ --.

Page 2, Column 2, item (56), Other Publications, Line 4, "2010." should read -- 2016. --.

In the Specification

Column 3, Line 15 (approx.), "or platelets" should read -- or platelets. --.

Column 9, Line 26, "$m^2/g$." should read -- $m^2/g$, --.

Column 10, Line 31, "state, and" should read -- state, --; and
Line 32, "binder," should read -- binder, and --.

Column 16, Line 48, "CAM.3" should read -- CAM.3. --.

Column 17, Line 19, "mA.h/kg" should read -- mA.h/kg. --;
Line 23, "$\Omega cm^2$" should read -- $\Omega cm^2$. --; and In the Claims Column 17, Line 35 (approx.), Claim 1, delete "(I)" and insert -- (I), --.

Column 18, Line 2, Claim 4, "$CO_b$" should read -- $Co_b$ --;
Line 2, Claim 4, "(I)" should read -- (I), --; and
Line 33 (approx.), Claim 9, "(II)" should read -- (II), --.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*